US011767926B2

(12) United States Patent
Sugaya et al.

(10) Patent No.: US 11,767,926 B2
(45) Date of Patent: Sep. 26, 2023

(54) FUEL INJECTION DEVICE

(71) Applicant: Hitachi Astemo, Ltd., Hitachinaka (JP)

(72) Inventors: Masashi Sugaya, Hitachinaka (JP);
Takao Miyake, Hitachinaka (JP);
Taisuke Sugii, Tokyo (JP); Takuya Watai, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/011,675

(22) PCT Filed: May 19, 2021

(86) PCT No.: PCT/JP2021/019020
§ 371 (c)(1),
(2) Date: Dec. 20, 2022

(87) PCT Pub. No.: WO2022/064766
PCT Pub. Date: Mar. 31, 2022

(65) Prior Publication Data
US 2023/0250889 A1     Aug. 10, 2023

(30) Foreign Application Priority Data

Sep. 24, 2020   (JP) ................................. 2020-159335

(51) Int. Cl.
*F16K 31/06*       (2006.01)
*F02M 51/06*      (2006.01)

(52) U.S. Cl.
CPC ............. *F16K 31/06* (2013.01); *F02M 51/06* (2013.01)

(58) Field of Classification Search
CPC ....... F16K 31/06; F02M 51/06; F02M 51/061
See application file for complete search history.

(56) References Cited

U.S. PATENT DOCUMENTS

2002/0066443 A1* 6/2002 Nakamura ........... F02M 69/465
123/594
2014/0346382 A1* 11/2014 Scheffel ................. F16K 31/06
251/129.15

(Continued)

FOREIGN PATENT DOCUMENTS

JP       2011-196235 A    10/2011
JP       2013-151915 A     8/2013
WO  WO-2018021124 A1 *  2/2018  ............. F02M 51/06

OTHER PUBLICATIONS

International Search Report (PCT/ISA/210) issued in PCT Application No. PCT/JP2021/019020 dated Jul. 13, 2021 with English translation (five (5) pages).

(Continued)

*Primary Examiner* — Grant Moubry
(74) *Attorney, Agent, or Firm* — Crowell & Moring LLP

(57) ABSTRACT

To provide a fuel injection device capable of improving waterproof performance of the coil portion. A fuel injection device 1 includes a coil bobbin 51 disposed in a housing 70 and having a bobbin outer peripheral surface 51a that holds a coil 50 and a bobbin inner peripheral surface 51b that is a surface on an opposite side of the bobbin outer peripheral surface 51a, and a first outer peripheral surface 46a and a first outer peripheral surface 10b (guide portion) that come into contact with the bobbin inner peripheral surface 51b. A first space S1 and a second space S2 (internal space) are formed by the first outer peripheral surface 46a and the first outer peripheral surface 10b, and the bobbin inner peripheral surface 51b, and the first space S1 and the second space S2 communicate with a space filled with the connecting portion 80.

9 Claims, 3 Drawing Sheets

(56) References Cited

U.S. PATENT DOCUMENTS

| | | | |
|---|---|---|---|
| 2016/0195052 A1* | 7/2016 | Kaneta | F02M 61/1833 |
| | | | 123/299 |
| 2018/0010564 A1* | 1/2018 | Miyake | F02M 61/188 |
| 2019/0003436 A1* | 1/2019 | Yasukawa | F02M 51/0671 |
| 2019/0078543 A1* | 3/2019 | Yamazaki | F16K 31/0655 |
| 2019/0203683 A1 | 7/2019 | Lee et al. | |
| 2023/0124370 A1* | 4/2023 | Ishihara | F02M 59/445 |
| | | | 417/505 |

OTHER PUBLICATIONS

Japanese-language Written Opinion (PCT/ISA/237) issued in PCT Application No. PCT/JP2021/019020 dated Jul. 13, 2021 (three (3) pages).

\* cited by examiner

FUEL INJECTION DEVICE

TECHNICAL FIELD

The present invention relates to a fuel injection device.

BACKGROUND ART

Conventionally, as an internal combustion engine, a cylinder injection type internal combustion engine that directly injects fuel into a cylinder by a fuel injection device is used. A technique related to a conventional fuel injection device includes, for example, a technique described in PTL 1.

In the fuel injection device described in PTL 1, a cup-shaped housing 103 is fixed to an outer periphery of a large-diameter cylindrical portion 23 of a nozzle holder 101. A through-hole is provided at the center of the bottom portion of the housing 103, and the large-diameter cylindrical portion 23 of the nozzle holder 101 is inserted into the through-hole. The portion of the outer peripheral wall of the housing 103 forms an outer peripheral yoke portion facing the outer peripheral surface of the large-diameter cylindrical portion 23 of the nozzle holder 101.

A coil 105 wound in an annular shape is disposed in a cylindrical space formed by the housing 103. The coil 105 is formed of an annular coil bobbin 104 with a groove having a U-shaped cross section opened toward the radially outer side and a copper wire wound in the groove. A rigid conductor 109 is fixed to a winding start end portion and a winding finish end portion of the coil 105, and the respective end portion is drawn out from a through-hole provided in the fixed core 107.

The conductor 109, the fixed core 107, and the outer periphery of the large-diameter cylindrical portion 23 of the nozzle holder 101 are mold formed by injecting an insulating resin from the inner periphery of the upper end opening of the housing 103. Therefore, the outer peripheries of the conductor 109, the fixed core 107, and the large-diameter cylindrical portion 23 of the nozzle holder 101 are covered with a resin formed body 121. Then, a toroidal magnetic path is formed around the coil 105.

The coil bobbin 104 around which the coil 105 is wound is mounted between the nozzle holder 101 (holding member) and the housing 103. The nozzle holder 101 is provided with a guide portion facing the inner peripheral surface of the coil bobbin 104. The guide portion suppresses deformation of the coil bobbin 104 due to the filling pressure of the sealing resin member filled in the space between the housing 103 and the coil 105.

CITATION LIST

Patent Literature

PTL 1: JP 2013-151915 A

SUMMARY OF INVENTION

Technical Problem

Incidentally, a fuel injection device (sometimes referred to as a fuel injection valve) used in an internal combustion engine is exposed to a severe environment such as water and a temperature cycle. Under a severe environment where the fuel injection device is submerged, water may enter the coil portion, and an electric conduction path may be formed between the housing inner peripheral surface and the coil. As a result, defects in which the insulation resistance of the coil decreases may occur. Therefore, it is desired to improve the waterproof performance of the coil portion.

In the fuel injection valve of PTL 1, the guide portion is provided in the vicinity of a lower end portion of a large-diameter portion (flange portion) of the fixed core 107 and in the vicinity of an upper end portion of a small-diameter portion of the housing 103. In this case, when the space between the housing 103 and the coil 105 is filled with the sealing resin member, air in the space between the housing 103 and the coil 105 remains in a filling range (space between the housing 103 and the coil 105) of the sealing resin member. As a result, a portion not filled with the sealing resin member is generated, which may affect the basic characteristics (flow rate, injection amount, generation of magnetic field, etc.) of the fuel injection device.

An object of the present invention is to provide a fuel injection device capable of improving waterproof performance of a coil portion in consideration of the above problems.

Solution to Problem

In order to solve the above problems and achieve the object, a fuel injection device includes a movable core, a fixed core facing the movable core, a coil that generates a magnetic attraction force between the fixed core and the movable core when energized, a housing that covers a radially outer side of the coil, and a resin member that is filled in the housing and coats the coil. The fuel injection device includes a bobbin disposed in the housing and having an outer peripheral surface for holding the coil and an inner peripheral surface, which is a surface on an opposite side of the outer peripheral surface, and a guide portion that comes into contact with the inner peripheral surface of the bobbin. An internal space is formed by the guide portion and the inner peripheral surface of the bobbin, and the internal space communicates with a space filled with the resin member.

Advantageous Effects of Invention

According to the fuel injection device having the above configuration, the waterproof performance of the coil portion can be improved.

Problems, configurations, and effects other than those described above will be made apparent by the description of the following embodiments.

DESCRIPTION OF EMBODIMENTS

Figure 1:
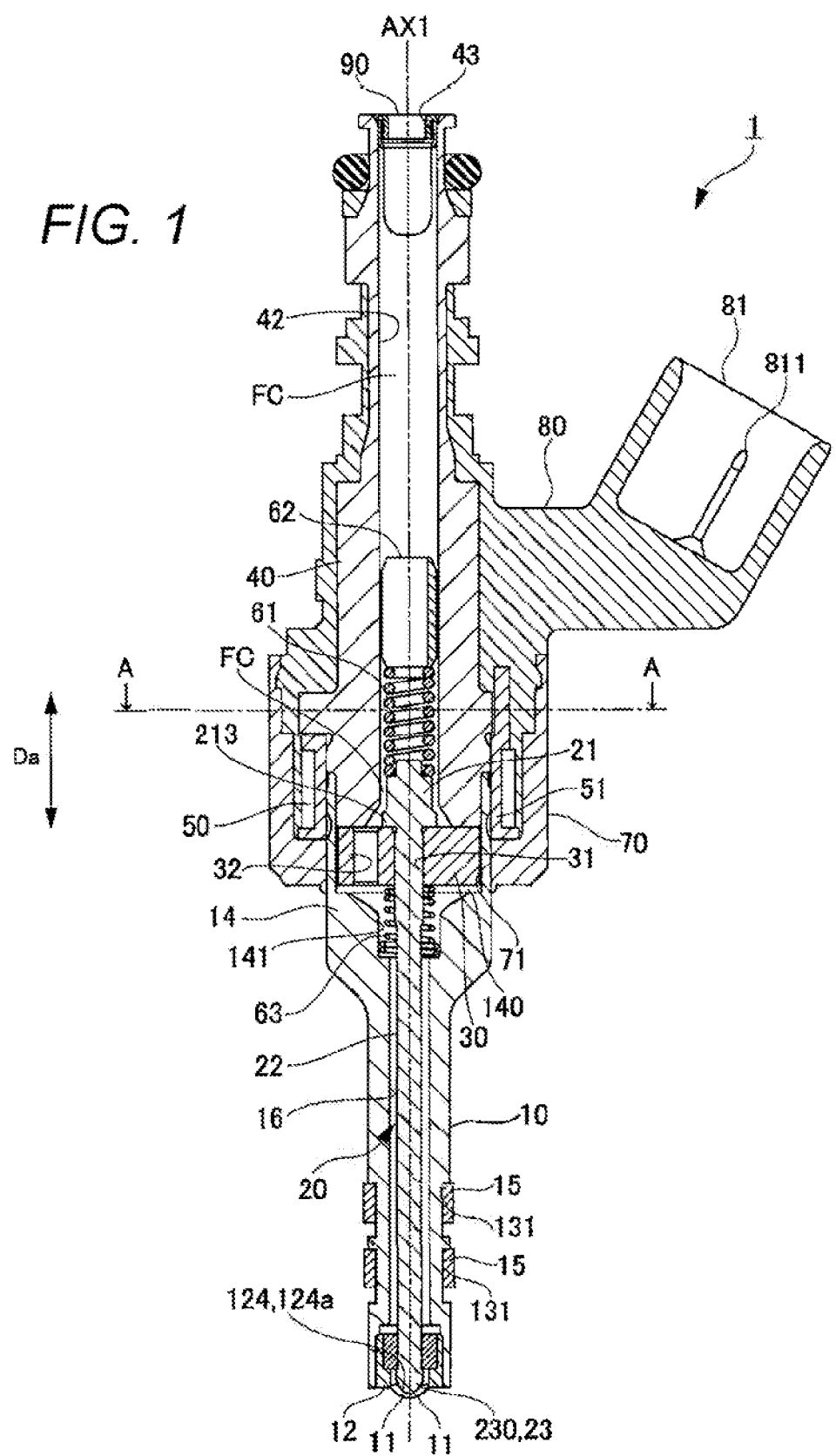
FIG. 1 is a cross-sectional view including a center axis line of a fuel injection device according to an embodiment of the present invention.

Hereinafter, an example of an embodiment of a fuel injection device will be described with reference to FIGS. 1 to 3. In the drawings, common members are denoted with the same reference numerals.

1. One Embodiment of Fuel Injection Device

1-1. Configuration of Fuel Injection Device

First, a configuration of an embodiment (hereinafter referred to as "present embodiment") of a fuel injection device will be described with reference to FIG. 1.

FIG. 1 is a cross-sectional view including a center axis line of a fuel injection device according to the present embodiment.

A fuel injection device 1 illustrated in FIG. 1 is used as an internal combustion engine in a four-cycle engine in which four strokes including an entry stroke, a compression stroke, a combustion (expansion) stroke, and an exhaust stroke are repeated. The fuel injection device 1 is applied to a cylinder injection type internal combustion engine that injects fuel into a cylinder of each cylinder.

In the present embodiment, a center axis line AX1 of the fuel injection device 1 coincides with the center axis line of each member of a nozzle main body 10, an injection hole forming member 12, a valve body 20, a movable core 30, and a fixed core 40 described later. In the present embodiment, the center axis line AX1 may be referred to as a center axis line of each of the members 10, 12, 20, 30, and 40.

Furthermore, in the following description, there is a case where description is made by designating the vertical direction. The vertical direction is based on the vertical direction in FIG. 1, and does not designate the vertical direction in the mounted state of the fuel injection device 1. An end of the fuel injection device 1 on a side where an injection hole 11 to be described later is provided is referred to as a distal end, and an end on the opposite side is referred to as a basal end. The center axis line AX1 is a line segment parallel to the center axis and passing through the center axis, and includes not only the center axis but also a line segment extending from the center axis. In addition, a direction along the center axis line AX1 will be referred to as an axis line direction Da.

As illustrated in FIG. 1, the fuel injection device 1 includes a nozzle main body 10, a valve body 20, a movable core 30, a fixed core 40, a coil 50, a housing 70, a connecting portion 80, and a filter 90. The fuel injection device 1 includes a first spring 61, a second spring 63, and an adjustment member 62.

[Nozzle Main Body]

The nozzle main body 10 is formed in a substantially cylindrical shape extending in the axis line direction Da. The nozzle main body 10 has a cylindrical hole 16. An injection hole forming member 12 is inserted or attached by press-fitting to a distal end portion, which is one end portion of the nozzle main body 10 in the axis line direction Da. The injection hole forming member 12 is fixed to the nozzle main body 10 by being welded over the entire circumference at the inner peripheral edge of the opening at the distal end portion of the nozzle main body 10.

The injection hole forming member 12 includes a seat portion 124. A plurality of injection holes 11 for injecting fuel is formed in the seat portion 124. The seat portion 124 is formed in a substantially hemispherical shape projecting out toward the distal end side in the axis line direction Da. A seat surface 124a with which a spherical surface portion 230 of the valve body 20 to be described later comes into contact and separates is formed inside the seat portion 124. The seat surface 124a is formed in a truncated cone shape whose diameter decreases toward the distal end side in the axis line direction Da.

A plurality of (two in this example) grooves 131 are formed on the outer peripheral surface on the distal end portion side of the nozzle main body 10. The groove 131 is continuously formed along the circumferential direction of the outer peripheral surface of the nozzle main body 10. The seal member 15 is fitted into the groove 131. The seal member 15 seals a gap between the cylinder and the fuel injection device 1 when the fuel injection device 1 is attached to the cylinder (not illustrated) of the internal combustion engine.

A large-diameter portion 14 having an outer diameter larger than that of the distal end portion is formed at a basal end portion which is the other end portion of the nozzle main body 10 in the axis line direction Da. An internal space 140 is formed in the large-diameter portion 14. The internal space 140 is formed in a bottomed cylindrical shape having an opening opened toward the basal end side.

In the internal space 140, a movable core 30 to be described later and a part of the fixed core 40 are disposed. A spring accommodating portion 141 formed concentrically with the internal space 140 is formed at a central portion of a bottom portion of the internal space 140. The spring accommodating portion 141 is a recess that is recessed in a cylindrical shape from the bottom portion toward the distal end portion of the internal space 140. One end portion of the second spring 63 is accommodated in the spring accommodating portion 141.

[Valve Body]

The valve body 20 is disposed inside the nozzle main body 10 so as to be movable along the axis line direction Da. The valve body 20 is formed in a round rod shape or a circular column shape. The valve body 20 includes a rear end portion 21, a distal end portion 23, and an intermediate portion 22 indicating an intermediate of the rear end portion 21 and the distal end portion 23. The distal end portion 23 is formed on the distal end side in the axis line direction Da of the valve body 20, and the rear end portion 21 is formed on the basal end side in the axis line direction Da of the valve body 20.

The distal end portion 23 is accommodated in an injection hole forming member 12 provided at the distal end portion of the nozzle main body 10. The distal end portion 23 opens and closes the injection hole 11 provided in the injection hole forming member 12 by the valve body 20 moving along the axis line direction Da. The distal end portion 23 has a spherical surface portion 230. The spherical surface portion 230 is formed in a substantially hemispherical shape. The spherical surface portion 230 faces the seat surface 124a of the seat portion 124, and approaches and separates to and from the seat surface 124a.

When the spherical surface portion 230 of the valve body 20 comes into contact with the seat surface 124a, the flow paths FC to the plurality of injection holes 11 are closed. Furthermore, when the spherical surface portion 230 separates from the seat surface 124a, a flow path FC through which fuel passes is formed between the spherical surface portion 230 and the seat surface 124a. As a result, fuel is injected from the plurality of injection holes 11.

The intermediate portion 22 is provided continuously from the basal end side in the axis line direction Da in the distal end portion 23. The intermediate portion 22 is disposed in the cylindrical hole 16 of the nozzle main body 10. A gap is formed between the outer peripheral surface of the intermediate portion 22 and the inner peripheral surface of the cylindrical hole 16. A rear end portion 21 is continuously provided from the basal end side in the axis line direction Da in the intermediate portion 22.

The rear end portion 21 is disposed in the internal space 140 of the nozzle main body 10. The rear end portion 21 is formed in a substantially circular column shape larger than the outer diameter of the intermediate portion 22. The rear end portion 21 is inserted into a cylindrical hole of the fixed core 40 described later. The rear end portion 21 is provided with an engagement portion 213. The engagement portion 213 bulges out toward the radially outer side from the outer peripheral surface of the rear end portion 21. The engagement portion 213 is engaged with a movable core 30 to be described later at the time of an on-off valve operation of the valve body 20.

Furthermore, one end portion of the first spring 61 is abutted to an end face on the rear end portion side in the axis line direction Da in the rear end portion 21. The valve body 20 is biased toward the distal end portion side (valve closing side) in the axis line direction Da by the first spring 61.

The valve body 20 having the above-described configuration is formed of a metal material such as SUS.

[Movable Core]

The movable core 30 is disposed between the rear end portion 21 of the valve body 20 and the bottom portion of the internal space 140 in the internal space 140 of the nozzle main body 10. In addition, a minute gap is formed between the outer peripheral surface of the movable core 30 and the inner peripheral surface of the large-diameter portion 14 forming the internal space 140. Therefore, the movable core 30 is arranged to be movable along the axis line direction Da in the internal space 140.

The movable core 30 is formed in a circular ring shape. An insertion hole 31 and an eccentric through-hole 32 are formed in the movable core 30. The insertion hole 31 and the eccentric through-hole 32 are through-holes penetrating the movable core 30 from one end portion to the other end portion in the axis line direction Da. The insertion hole 31 is formed on the center axis of the movable core 30. The intermediate portion 22 of the valve body 20 is inserted into the insertion hole 31.

The eccentric through-hole 32 is formed at a position eccentric from the center axis of the movable core 30. The eccentric through-hole 32 communicates with a flow path FC formed by the outer peripheral surface of the valve body 20 and the inner peripheral surface of the fixed core 40. The eccentric through-hole 32 forms a flow path FC through which the fuel passes.

The other end portion of the second spring 63 abutted to the end face on the distal end side in the axis line direction Da in the movable core 30. Therefore, the second spring 63 is interposed between the movable core 30 and the spring accommodating portion 141 of the nozzle main body 10. In addition, the fixed core 40 is abutted to the end face on the basal end side in the axis line direction Da in the movable core 30.

[Fixed Core]

The fixed core 40 is a member that attracts the movable core 30 by magnetic attraction force. The fixed core 40 is formed in a substantially cylindrical shape having irregularities on the outer peripheral surface. A distal end portion of the fixed core 40 in the axis line direction Da is press-fitted into the inner side of the large-diameter portion 14 of the nozzle main body 10, that is, into the internal space 140. The nozzle main body 10 and the fixed core 40 are joined by welding. As a result, the gap between the nozzle main body 10 and the fixed core 40 is sealed, and the space inside the nozzle main body 10 is sealed.

In addition, the distal end portion of the fixed core 40 faces the end face on the basal end side in the axis line direction Da of the movable core 30 disposed in the internal space 140. The opposing distal end portion of the movable core 30 in the fixed core 40 may be coated by plating such as hard chromium plating or electroless nickel plating. As a result, the durability and reliability of the distal end portion of the fixed core 40 with which the movable core 30 collides can be improved.

The rear end portion facing the fixed core 40 in the movable core 30 may be coated by plating such as hard chromium plating or electroless nickel plating. Thus, even when a relatively soft magnetic stainless steel is applied as the movable core 30, durability and reliability of the movable core 30 can be secured.

The rear end portion side of the fixed core 40 in the axis line direction Da projects out from the internal space 140 of the nozzle main body 10 toward the rear end in the axis line direction Da.

A through-hole 42 is formed in the fixed core 40. The through-hole 42 is formed coaxially with the center axis line AX1. The eccentric through-hole 42 forms a flow path FC through which the fuel passes. An opening 43 communicating with the through-hole 42 is formed at the rear end portion in the axis line direction Da of the fixed core 40. Fuel is introduced from the opening 43 toward the through-hole 42. Furthermore, a filter 90 is inserted from the opening 43 to through-hole 42.

Furthermore, the first spring 61 and an adjustment member 62 are disposed on the distal end portion side in the axis line direction Da of the through-hole 42. The first spring 61 is disposed on the distal end portion side of the through-hole 42 than the adjustment member 62. The adjustment member 62 is press-fitted into the through-hole 42 and fixed inside the fixed core 40. The rear end portion 21 of the valve body 20 is inserted into the distal end portion of the through-hole 42. The first spring 61 is interposed between the adjustment member 62 and the rear end portion 21 of the valve body 20. The first spring 61 biases the valve body 20 in the axis line direction Da toward the distal end portion of the nozzle main body 10.

In addition, the biasing force of the valve body 20 in the first spring 61 can be adjusted by adjusting the fixing position of the adjustment member 62 with respect to the fixed core 40. As a result, it is possible to adjust an initial load at which the distal end portion 23 of the valve body 20 presses against the seat surface 124a provided in the injection hole forming member 12 of the nozzle main body 10.

The biasing force with which the first spring 61 biases the valve body 20 toward the distal end portion of the nozzle main body 10 is set to be larger than the biasing force with which the second spring 63 biases the movable core 30 toward the fixed core 40.

[Coil]

The coil 50 is wound around a cylindrical coil bobbin 51. The coil 50 wound around the coil bobbin 51 is disposed so as to cover a part of the outer peripheral surface of the large-diameter portion 14 and a part of the outer peripheral surface of the distal end portion of the fixed core 40 in the nozzle main body 10. The end portions of winding start and winding end of the coil 50 are connected to a power supply terminal 811 of a connector 81 of a connecting portion 80 described later through wiring (not illustrated). The housing 70 is fixed to the outer peripheries of the coil 50 and the coil bobbin 51.

[Housing]

The housing 70 is formed in a bottomed cylindrical shape. A through-hole 71 is formed in a bottom portion which is a distal end portion of the housing 70 in the axis line direction Da. The through-hole 71 is formed in a central portion of the bottom portion. The large-diameter portion 14 of the nozzle main body 10 is inserted into the through-hole 71. The opening edge of the through-hole 71 and the outer peripheral surface of the nozzle main body 10 are welded, for example, over the entire periphery. Accordingly, the nozzle main body 10 is fixed to the housing 70.

The housing 70 is disposed so as to surround the distal end portion side of the fixed core 40, the outer peripheries of the coil bobbin 51 and the coil 50. The inner peripheral surface of the housing 70 faces the large-diameter portion 14 of the nozzle main body 10 and the coil 50 to form an outer peripheral yoke portion. In this manner, a toroidal-shaped magnetic passage including the fixed core 40, the movable core 30, the nozzle main body 10, and the housing 70 is formed around the coil 50.

[Connecting Portion]

The connecting portion 80 is formed of resin. The connecting portion 80 is filled between the fixed core 40, the coil 50, the coil bobbin 51, and the housing 70. In addition, the connecting portion 80 covers the outer peripheral surface excluding the rear end portion of the fixed core 40 on the basal end side in the axis line direction Da with respect to the housing 70. The connecting portion 80 is molded so as to form the connector 81 having the power supply terminal 811. The terminal 811 is connected to a connection terminal (not illustrated) of the plug. Accordingly, the fuel injection device 1 is connected to a high-voltage power supply or a battery power supply. Then, energization to the coil 50 is controlled by an engine control unit (ECU) (not illustrated).

1-2. Operation Example of Fuel Injection Device

Next, an operation example of the fuel injection device 1 having the above-described configuration will be described with reference to FIG. 1.

The fuel injection device 1 is installed on a wall surface of a cylinder constituting an internal combustion engine. In the fuel injection device 1, the distal end portion of the nozzle main body 10, which is a distal end portion for injecting fuel, is disposed in a combustion chamber formed by an inner wall surface of a cylinder and a piston. The distal end portion of the nozzle main body 10 in the fuel injection device 1 is disposed toward the ignition plug.

As described above, the biasing force of the first spring 61 is set to be larger than the biasing force of the second spring 63. Therefore, in a state where the coil 50 is not energized, the distal end portion 23 of the valve body 20 is pressed against the seat surface 124a of the injection hole forming member 12. As a result, the flow paths FC to the plurality of injection holes 11 are closed by the valve body 20 to be in a valve closed state.

Next, when the coil 50 is energized by the ECU, a magnetic flux flows through a magnetic circuit including the fixed core 40, the movable core 30, the nozzle main body 10, and the housing 70. Then, a magnetic attraction force for attracting the movable core 30 is generated in the fixed core 40. When the magnetic attraction force of the fixed core 40 exceeds the biasing force of the first spring 61, that is, the set load, the movable core 30 moves toward the fixed core 40. The movable core 30 moves until the end face facing the fixed core 40, that is, the basal end side end face collides with the distal end side end face of the fixed core 40.

When the movable core 30 moves, the engagement portion 213 provided at the rear end portion 21 of the valve body 20 and the movable core 30 are engaged. Therefore, the valve body 20 moves toward the basal end side along the axis line direction Da toward the fixed core 40 together with the movable core 30.

When the valve body 20 moves toward the fixed core 40, the distal end portion 23 of the valve body 20 separates away from the injection hole forming member 12. Therefore, the flow path FC up to the plurality of injection holes 11 formed between the valve body 20 and the injection hole forming member 12 is opened, and the valve open state in which the plurality of injection holes 11 are opened is obtained.

When the valve body 20 is in the valve open position (valve open state), fuel is introduced into the opening 43 of the fixed core 40 through the filter 90. Then, the fuel flows toward the nozzle main body 10 through the through-hole 42 of the fixed core 40. The fuel passes through the adjustment member 62 and the first spring 61 disposed in the through-hole 42, and flows through the flow path FC formed between the valve body 20 and the inner peripheral surface of the fixed core 40. Then, the fuel flows into the internal space 140 of the nozzle main body 10 through the eccentric through-hole 32 of the movable core 30.

The fuel flowing into the internal space 140 passes through a gap formed between the valve body 20 and the cylindrical hole 16 of the nozzle main body 10, and flows to the distal end side of the nozzle main body 10. Then, the fuel flows through a flow path FC formed between the distal end portion 23 of the valve body 20 and the injection hole forming member 12, and is injected into the combustion chamber of the internal combustion engine through the plurality of injection holes 11.

When the energization of the coil 50 is interrupted by the ECU, the magnetic flux flowing through the magnetic circuit including the fixed core 40, the movable core 30, the nozzle main body 10, and the housing 70 disappears. Then, the magnetic attraction force of the fixed core 40 that attracts the movable core 30 also disappears. Therefore, the elastic force of the first spring 61 biasing the valve body 20 toward the injection hole forming member 12 of the nozzle main body 10 returns to the initial state larger than the elastic force of the second spring 63 biasing the movable core 30 toward the fixed core 40.

As a result, the valve body 20 is biased toward the injection hole forming member 12 of the nozzle main body 10 by the first spring 61 and moves to the distal end portion along the axis line direction Da. In addition, the movable core 30 engaged with the engagement portion 213 of the valve body 20 moves toward the distal end side along the axis line direction Da together with the valve body 20. As a result, the distal end portion 23 of the valve body 20 is pressed against the seat surface 124a of the injection hole forming member 12, and the flow path FC to the plurality of injection holes 11 is closed by the valve body 20 to be in a valve closed state. As a result, the fuel injection by the fuel injection device 1 is stopped.

2. Detailed Configurations of Nozzle Main Body, Fixed Core, and Coil Bobbin

Next, detailed configurations of the nozzle main body 10, the fixed core 40, and the coil bobbin 51 will be described with reference to FIGS. 2 and 3.

Figure 2:
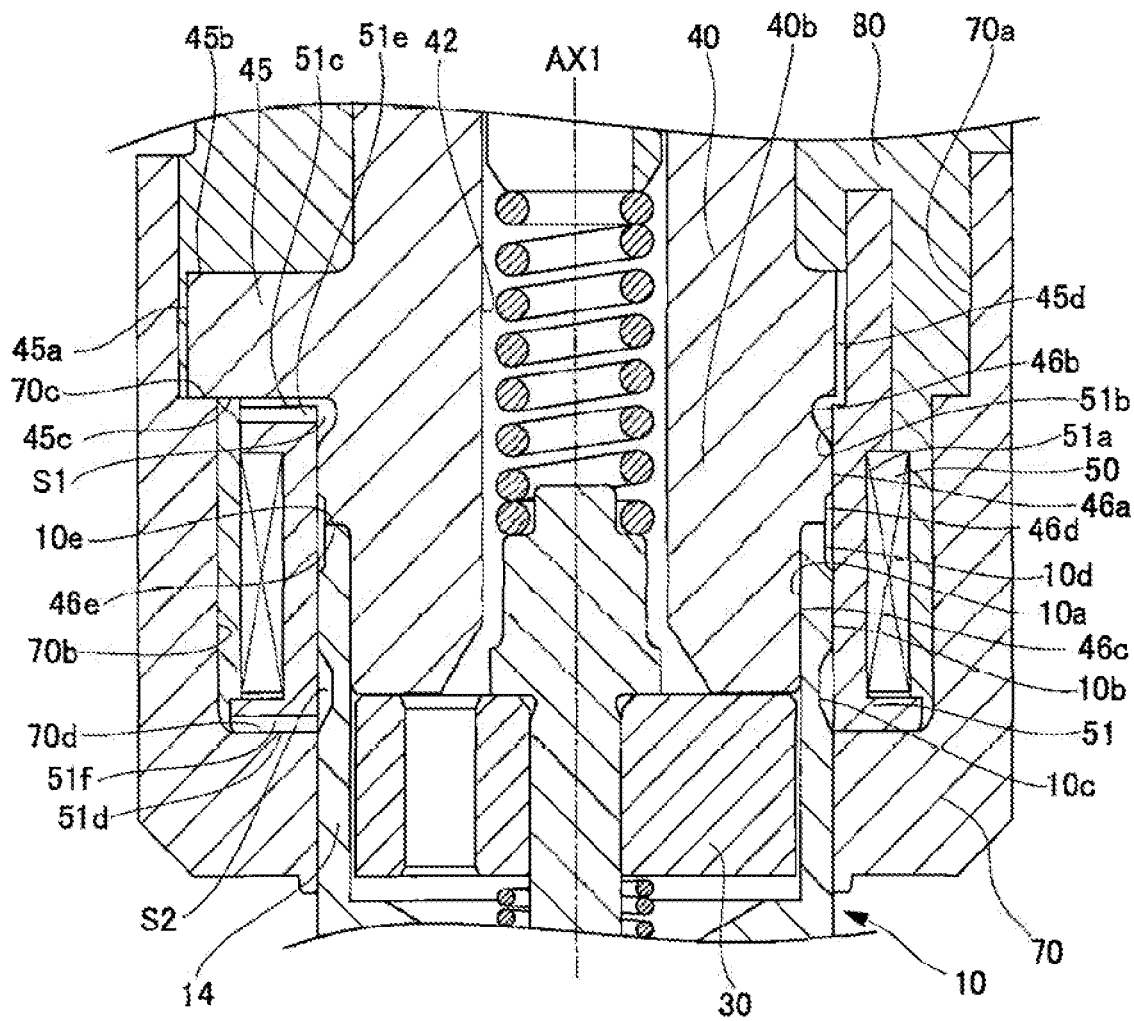
FIG. 2 is an enlarged cross-sectional view showing the periphery of a housing and a coil of FIG. 1 in an enlarged manner.

FIG. 2 is an enlarged cross-sectional view showing the periphery of a housing 70 and a coil 50 of FIG. 1 in an enlarged manner. FIG. 3 is a cross-sectional view taken along line A-A illustrated in FIG. 1.

As illustrated in FIG. 2, the fixed core 40 faces the movable core 30. Hereinafter, a direction in which the movable core 30 and the fixed core 40 face each other (axis line direction Da) is defined as a vertical direction. In the vertical direction, a side on which the fixed core 40 is disposed is defined as an upper side, and a side on which the movable core is disposed is defined as a lower side.

In the housing 70, a first inner peripheral surface 70a is formed on the upper end side, and a second inner peripheral surface 70b is formed on the lower side of the first inner peripheral surface 70a. The second inner peripheral surface 70b is formed to have a smaller diameter than the first inner peripheral surface 70a. The second inner peripheral surface 70b faces the coil 50 by way of the connecting portion 80. A step surface 70c is formed between the first inner peripheral surface 70a and the second inner peripheral surface 70b. Furthermore, the housing 70 has an inner bottom surface 70d continuing to the second inner peripheral surface 70b. The inner bottom surface 70d is formed in a plane substantially perpendicular to the vertical direction.

The coil bobbin 51 has a bobbin outer peripheral surface 51a around which the coil 50 is wound, and a bobbin inner peripheral surface 51b which is a surface on a side opposite to the bobbin outer peripheral surface 51a. The coil bobbin 51 has a bobbin upper end face 51c and a bobbin lower end face 51d which are end faces orthogonal to the axial direction of the coil 50.

The coil bobbin 51 is arranged such that the axial direction of the coil 50 is parallel to the vertical direction. The axial center of the coil 50 coincides with the center axis line AX1. The bobbin upper end face 51c faces a large-diameter portion 45 described later of the fixed core 40. The bobbin lower end face 51d abuts on the inner bottom surface 70d of the housing 70.

The fixed core 40 includes a large-diameter portion 45 and a small-diameter portion 46. The large-diameter portion 45 is formed on the upper side in the vertical direction of the small-diameter portion 46. The large-diameter portion 45 is formed as a flange portion bulging out toward a radially outer side than the small-diameter portion 46. The large-diameter portion 45 has an outer peripheral surface 45a, an upper end face 45b which is an end face on the upper side, and a lower end face 45c which is an end face on the lower side. The lower end face 45c of the large-diameter portion 45 abuts on the step surface 70c of the housing 70. As a result, it is fixed to the housing 70, and the relative position between the nozzle main body 10 and the fixed core 40 is determined.

Figure 3:
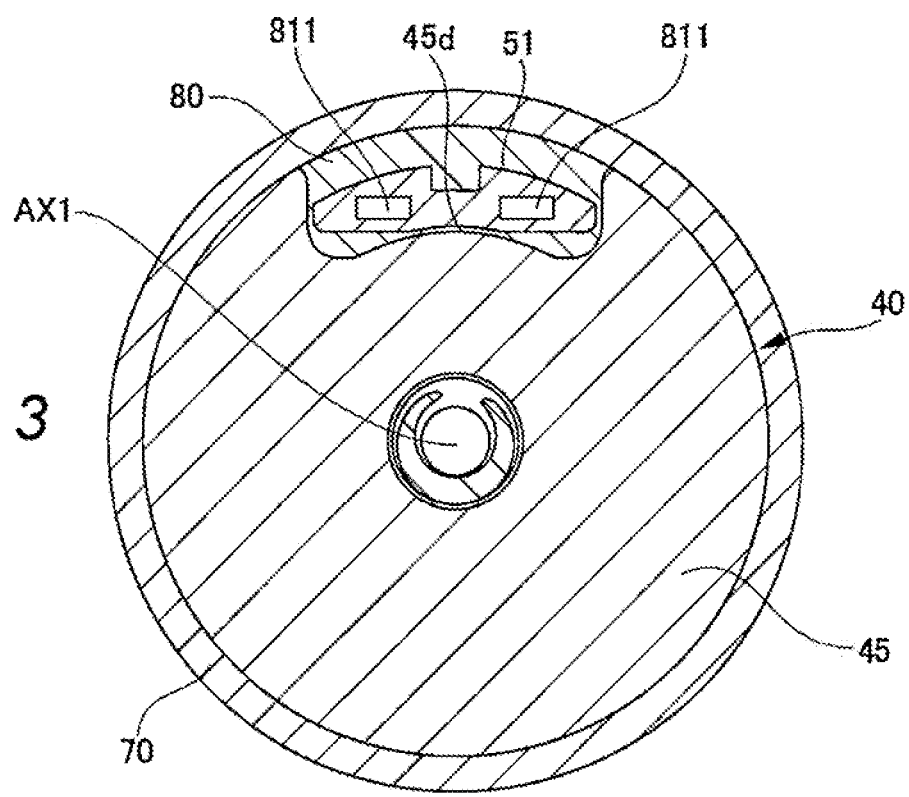
FIG. 3 is a cross-sectional view taken along line A-A illustrated in FIG. 1.

As illustrated in FIG. 3, the large-diameter portion 45 is formed with a notch 45d. The resin member forming the connecting portion 80 is filled in the housing 70 from above the large-diameter portion 45 through the notch 45d. Then, the resin member filled in the housing 70 advances so as to go around to the periphery of the coil 50 (coil bobbin 51). Therefore, the side symmetrical to the notch 45d with respect to the center axis (center axis line AX1) of the coil 50 is finally filled with resin member.

The small-diameter portion 46 faces the movable core 30. The small-diameter portion 46 has a first outer peripheral surface 46a, a second outer peripheral surface 46b, and a recessed portion 46c.

The first outer peripheral surface 46a is formed at an intermediate portion of the small-diameter portion 46 in the vertical direction. The first outer peripheral surface 46a comes into contact with the bobbin inner peripheral surface 51b of the coil bobbin 51. The first outer peripheral surface 46a of the fixed core 40 corresponds to a first guide portion according to the present invention. The first outer peripheral surface 46a (first guide portion) is in contact with the bobbin inner peripheral surface 51b on the upper side of the center position in the axial direction (vertical direction) of the coil 50.

The second outer peripheral surface 46b is formed between the first outer peripheral surface 46a and the outer peripheral surface 45a (notch outer peripheral surface 45d) of the large-diameter portion 45. The diameter of the second outer peripheral surface 46b is smaller than the diameter of the first outer peripheral surface 46a. Thus, the first outer peripheral surface 46a forms a groove portion continuing in the circumferential direction of the small-diameter portion 46. As a result, the second outer peripheral surface 46b forms the first space S1 with the bobbin inner peripheral surface 51b of the coil bobbin 51. That is, the first space S1 is formed on the upper side of the first outer peripheral surface 46a.

A first space communication groove 51e is formed in the bobbin upper end face 51c of the coil bobbin 51. The first space communication groove 51e communicates a space filled with the connecting portion 80 (resin member) and the first space S1. That is, the first space S1 communicates with a space filled with the resin member.

In the present embodiment, a gap is provided between the lower end face 45c of the large-diameter portion 45 and the bobbin upper end face 51c. Therefore, even if the first space communication groove 51e is not provided in the bobbin upper end face 51c, the first space S1 communicates with the space filled with the resin member. When no gap is provided between the lower end face 45c of the large-diameter portion 45 and the bobbin upper end face 51c, the first space S1 communicates with the space filled with the resin member by providing the first space communication groove 51e in the bobbin upper end face 51c.

The recessed portion 46c forms a lower end portion of the small-diameter portion 46. The diameter of the recessed portion 46c is smaller than the diameter of the first outer peripheral surface 46a. The recessed portion 46c is inserted into the nozzle main body 10. A third outer peripheral surface 46d and a step surface 46e are formed between the first outer peripheral surface 46a and the recessed portion 46c. The third outer peripheral surface 46d is larger than the diameter of the recessed portion 46c and smaller than the diameter of the first outer peripheral surface 46a.

The large-diameter portion 14 of the nozzle main body 10 is disposed on the inner side of the coil bobbin 51. The large-diameter portion 14 has an inner peripheral surface 10a, a first outer peripheral surface 10b, a second outer peripheral surface 10c, a third outer peripheral surface 10d, and an upper end face 10e.

The recessed portion 46c of the fixed core 40 is press-fitted into the inner peripheral surface 10a of the nozzle main body 10. The first outer peripheral surface 10b of the nozzle main body 10 is formed at an intermediate portion of the large-diameter portion 14 in the vertical direction. The first outer peripheral surface 10b comes into contact with the bobbin inner peripheral surface 51b of the coil bobbin 51. The first outer peripheral surface 10b of the nozzle main body 10 corresponds to a second guide portion according to the present invention. The first outer peripheral surface 10b (second guide portion) is in contact with the bobbin inner peripheral surface 51b on the lower side of the center position in the axial direction (vertical direction) of the coil 50.

As described above, the first outer peripheral surface 46a of the fixed core 40 and the first outer peripheral surface 10b of the nozzle main body 10 come into contact with the bobbin inner peripheral surface 51b on the upper side and the lower side of the center position in the axial direction (vertical direction) of the coil 50. Accordingly, when filling the inner side of the housing 70 with the connecting portion 80 (resin member), the coil bobbin 51 can be prevented from being deformed by the pressure of the resin member. As a result, the coil 50 wound around the coil bobbin 51 can be prevented or suppressed from being disturbed, and the coil 50 can be stably coated by the connecting portion 80 (resin member). Therefore, the waterproof performance of the coil 50 can be improved, and the influence on the basic characteristics (flow rate, injection amount, generation of magnetic field, etc.) of the fuel injection device 1 can be suppressed.

The second outer peripheral surface 10c of the nozzle main body 10 is formed on the lower side of the first outer peripheral surface 10b. The diameter of the second outer peripheral surface 10c is smaller than the diameter of the first outer peripheral surface 10b. Thus, the second outer peripheral surface 10c forms a groove portion continuing in the circumferential direction of the nozzle main body 10. As a result, the second outer peripheral surface 10c forms the second space S2 with the bobbin inner peripheral surface 51b of the coil bobbin 51. That is, the second space S2 is formed on the lower side of the first outer peripheral surface 10b.

A second space communication groove 51f is formed in the bobbin lower end face 51d of the coil bobbin 51. The second space communication groove 51f communicates a space filled with the connecting portion 80 (resin member) and the second space S2. That is, the second space S2 communicates with a space filled with the resin member.

The first space communication groove 51e and the second space communication groove 51f are provided at symmetrical positions with respect to a filling port (notch 45d) through which the housing 70 is filled with the resin member about the center axis (center axis line AX1) of the coil 50. That is, the first space communication groove 51e and the second space communication groove 51f are provided on the side opposite to the notch 45d side with the center axis line AX1 in between in the bobbin upper end face 51c and the bobbin lower end face 51d.

Most of the air between the housing 70 and the coil 50 before the resin member is filled comes out of the filling port (notch 45d) when the resin member is filled, but some of the air does not come out of the filling port (notch 45d). The air that has not come out of the filling port (notch 45d) advances so as to go around to the periphery of the coil 50 (coil bobbin 51) together with the resin member. Then, the air is entrapped in the first space S1 or the second space S2 through the first space communication groove 51e or the second space communication groove 51f.

As a result, it is possible to prevent air from remaining between the housing 70 and the coil 50, and the coil 50 can be stably coated by the connecting portion 80 (resin member). As a result, the waterproof performance of the coil 50 can be improved, and the influence on the basic characteristics (flow rate, injection amount, generation of magnetic field, etc.) of the fuel injection device 1 can be suppressed.

The third outer peripheral surface 10d of the nozzle main body 10 is formed on the upper side of the first outer peripheral surface 10b and reaches the upper end face 10e. The third outer peripheral surface 10d is larger than the diameter of the second outer peripheral surface 10c and smaller than the diameter of the first outer peripheral surface 10b. The third outer peripheral surface 10d is substantially equal to the third outer peripheral surface 46d of the fixed core 40. The upper end face 10e of the nozzle main body 10 abuts on the step surface 46e of the fixed core 40 in the vertical direction. As a result, the relative position between the fixed core 40 and the nozzle main body 10 is determined. The boundary portion between the nozzle main body 10 and the fixed core 40 is joined by welding.

As described above, the third outer peripheral surface 46d of the fixed core 40 is smaller in diameter than the first outer peripheral surface 46a, and the third outer peripheral surface 10d of the nozzle main body 10 is smaller in diameter than the first outer peripheral surface 10b. As a result, even if the boundary portion between the third outer peripheral surface 46d of the fixed core 40 and the third outer peripheral surface 10d of the nozzle main body 10 is welded, the welded portion can be prevented from projecting out to the outer side in the radial direction from the first outer peripheral surface 46a of the fixed core 40 and the first outer peripheral surface 10b of the nozzle main body 10.

The nozzle main body 10 receives a load in the outer diameter direction and downward in the vertical direction by the fuel pressure in the flow path FC. Therefore, in the present embodiment, the upper end face 10e of the nozzle main body 10 abuts on the step surface 46e of the fixed core 40 in the vertical direction. That is, the upper end face 10e and the step surface 46e come into contact with each other in a direction substantially perpendicular to the direction in which the load due to the fuel pressure is applied.

As a result, the downward load due to the fuel pressure can be substantially uniformly received by the upper end face 10e and the step surface 46e. Therefore, when the boundary between the upper end face 10e and the step surface 46e is welded along the circumferential direction, the maximum stress that is generated becomes smaller than when a portion (press-fitted portion) overlapping in a direction parallel to the direction in which the load is applied is welded. As a result, the joining strength between the nozzle main body 10 and the fixed core 40 can be increased.

The large-diameter portion of the conventional nozzle main body is formed to have a length such that an end face reaches the large-diameter portion 45 of the fixed core 40 (see JP 2013-151915 A). On the other hand, in the present embodiment, the first guide portion (first outer peripheral surface 46a) is provided in the fixed core 40, and the second guide portion (first outer peripheral surface 10b) is provided in the large-diameter portion 14 of the nozzle main body 10. Thus, the length of the large-diameter portion 14 in the nozzle main body 10 becomes shorter than the conventional length, so that the processing amount for forming the nozzle main body 10 (large-diameter portion 14) can be made smaller than the conventional amount. In addition, since the nozzle main body 10 can be downsized, the material to be used (member before processing) can be reduced, and the cost can be reduced.

In the present embodiment, the first outer peripheral surface 46a serving as the first guide portion is provided in the fixed core 40, and the first outer peripheral surface 10b serving as the second guide portion is provided in the nozzle main body 10. However, the first guide portion and the second guide portion according to the present invention may be provided in the fixed core. In this case, the joining portion between the fixed core and the nozzle main body is provided on the lower side in the vertical direction than in the embodiment. The first guide portion and the second guide portion in this case preferably come into contact with the bobbin inner peripheral surface 51b on the upper side and the lower side of the center position in the axial direction (vertical direction) of the coil 50.

When the joining portion between the fixed core and the nozzle main body is shifted to the lower side in the vertical direction as compared with the embodiment, one guide portion may be provided in the fixed core. The guide portions in this case preferably come into contact with the upper side and the lower side with the center position in the axial direction (vertical direction) of the coil 50 in between.

The first guide portion and the second guide portion according to the present invention may be provided in the nozzle main body 10. In this case, the joining portion between the fixed core and the nozzle main body is provided at the press-fitted portion on the upper side in the vertical direction as compared with the embodiment. The first guide portion and the second guide portion in this case preferably come into contact with the bobbin inner peripheral surface 51*b* on the upper side and the lower side of the center position in the axial direction (vertical direction) of the coil 50.

When the joining portion between the fixed core and the nozzle main body is provided at the press-fitted portion on the upper side in the vertical direction as compared with the embodiment, one guide portion may be provided in the nozzle main body. The guide portions in this case preferably come into contact with the upper side and the lower side with the center position in the axial direction (vertical direction) of the coil 50 in between.

3. Summary

As described above, a fuel injection device 1 (fuel injection device) according to the embodiment described above includes a movable core 30 (movable core), a fixed core 40 (fixed core) facing the movable core 30, a coil 50 (coil) that generates a magnetic attraction force between the fixed core 40 and the movable core 30 when energized, a housing 70 (housing) that covers a radially outer side of the coil 50, and a connecting portion 80 (resin member) that is filled in the housing 70 and coats the coil 50. The fuel injection device 1 includes a coil bobbin 51 (bobbin) disposed in the housing 70 and having a bobbin outer peripheral surface 51*a* (outer peripheral surface) that holds the coil 50 and a bobbin inner peripheral surface 51*b* (inner peripheral surface) that is a surface on an opposite side of the bobbin outer peripheral surface 51*a*, and a first outer peripheral surface 46*a* and a first outer peripheral surface 10*b* (guide portion) that come into contact with the bobbin inner peripheral surface 51*b*. A first space S1 and a second space S2 (internal space) are formed by the first outer peripheral surface 46*a* and the first outer peripheral surface 10*b*, and the bobbin inner peripheral surface 51*b*, and the first space S1 and the second space S2 communicate with a space filled with the connecting portion 80.

As a result, it is possible to prevent air from remaining between the housing 70 and the coil 50, and the coil 50 can be stably coated by the connecting portion 80. As a result, the waterproof performance of the coil 50 can be improved, and the influence on the basic characteristics (flow rate, injection amount, generation of magnetic field, etc.) of the fuel injection device 1 can be suppressed. Furthermore, since the first outer peripheral surface 46*a* and the first outer peripheral surface 10*b* are in contact with the bobbin inner peripheral surface 51*b*, the coil bobbin 51 can be prevented from being deformed by the pressure of the resin member when the connecting portion 80 is filled inside the housing 70. As a result, the coil 50 wound around the coil bobbin 51 can be prevented or suppressed from being disturbed, and the coil 50 can be stably coated by the connecting portion 80.

Furthermore, in the fuel injection device 1 (fuel injection device) according to the embodiment described above, when a direction in which the movable core 30 (movable core) and the fixed core 40 (fixed core) face each other is defined as a vertical direction, a side on which the fixed core 40 is disposed is defined as an upper side, and a side on which the movable core 30 is disposed is defined as a lower side, the internal space has a first space S1 (first space) and a second space S2 (second space). The first space S1 is formed on the upper side in the vertical direction than the first outer peripheral surface 46*a* by the first outer peripheral surface 46*a* (guide portion) and the bobbin inner peripheral surface 51*b* (inner peripheral surface). The second space S2 is formed on the lower side in the vertical direction than the first outer peripheral surface 10*b* by the first outer peripheral surface 10*b* (guide portion) and the bobbin inner peripheral surface 51*b*. At least one of the first space S1 and the second space S2 communicates with a space filled with the connecting portion 80. Thus, the air between the housing 70 and the coil 50 can be easily entrapped in the first space S1 or the second space S2.

The axial direction of the coil 50 (coil) in the fuel injection device 1 (fuel injection device) according to the embodiment described above is parallel to the vertical direction. The guide portion includes a first outer peripheral surface 46*a* (first guide portion) that faces the upper side of the center position in the vertical direction of the coil 50 and comes into contact with the bobbin inner peripheral surface 51*b* (inner peripheral surface) of the coil bobbin 51 (bobbin), and a first outer peripheral surface 10*b* (second guide portion) that faces the lower side of the center position in the vertical direction of the coil 50 and comes into contact with the bobbin inner peripheral surface 51*b*. Thus, the pressure of the filling member can be prevented from concentrating on a part of the bobbin inner peripheral surface 51*b*. As a result, when filling the inner side of the housing 70 with the connecting portion 80 (resin member), the coil bobbin 51 can be prevented from being deformed by the pressure of the resin member.

The fuel injection device 1 (fuel injection device) according to the embodiment described above includes the valve body 20 (valve body) that moves in the vertical direction by the movable core 30 (movable core), and the nozzle main body 10 (nozzle) that movably accommodates the valve body 20. The first outer peripheral surface 46*a* (first guide portion) is provided on the fixed core 40 (fixed core) arranged on the inner side of the coil bobbin 51 (bobbin). The first outer peripheral surface 10*b* (second guide portion) is provided on the nozzle main body 10 disposed on the inner side of the coil bobbin 51. Thus, the processing amount for forming the nozzle main body 10 can be reduced. In addition, since the nozzle main body 10 can be downsized, the material to be used (member before processing) can be reduced, and the cost can be reduced.

In addition, the fuel injection device according to the present invention may include the valve body 20 (valve body) that moves in the vertical direction by the movable core 30 (movable core), and the nozzle main body 10 (nozzle) that movably accommodates the valve body 20, and the first outer peripheral surface 46*a* (first guide portion) and the first outer peripheral surface 10*b* (second guide portion) may be provided in the nozzle main body 10 disposed on the inner side of the coil bobbin 51 (bobbin). Thus, the processing of making diameters (heights) of the first guide portion and the second guide portion the same can be facilitated. When the first guide portion and the second guide portion are provided on the nozzle main body 10, the first guide portion and the second guide portion may be formed as one guide portion without forming the recess (second outer peripheral surface 10*c*) between the first guide portion and the second guide portion. Thus, the processing of forming the guide portion can be simplified.

In the fuel injection device according to the present invention, the first outer peripheral surface 46*a* (first guide portion) and the first outer peripheral surface 10*b* (second guide portion) may be provided on the fixed core 40 (fixed core) disposed on the inner side of the coil bobbin 51 (bobbin). Thus, the processing of making diameters of the first guide portion and the second guide portion the same can be facilitated. When the first guide portion and the second guide portion are provided on the fixed core 40, the first guide portion and the second guide portion may be formed as one guide portion without forming the recess (second outer peripheral surface 10c) between the first guide portion and the second guide portion. Thus, the processing of forming the guide portion can be simplified.

In addition, the first space S1 (first space) in the fuel injection device 1 (fuel injection device) according to the embodiment described above communicates with a space filled with the connecting portion 80 (resin member). The coil bobbin 51 (bobbin) has a first space communication groove 51e (first space communication groove) that communicates the space filled with the connecting portion 80 and the first space S1. As a result, the space filled with the connecting portion 80 and the first space S1 can be reliably communicated. As a result, it is possible to prevent air from remaining between the housing 70 and the coil 50, and the coil 50 can be stably coated by the connecting portion 80.

In addition, the second space S2 (second space) in the fuel injection device 1 (fuel injection device) according to the embodiment described above communicates with a space filled with the connecting portion 80 (resin member). The coil bobbin 51 (bobbin) has a second space communication groove 51f (second space communication groove) that communicates the space filled with the connecting portion 80 and the second space S2. Thus, the space filled with the connecting portion 80 and the second space S2 can be reliably communicated. As a result, it is possible to prevent air from remaining between the housing 70 and the coil 50, and the coil 50 can be stably coated by the connecting portion 80.

Further, the first space communication groove 51e (first space communication groove) or the second space communication groove 51f (second space communication groove) in the fuel injection device 1 (fuel injection device) according to the embodiment described above is provided at a position symmetrical to the filling port through which the connecting portion 80 (resin member) is filled in the housing 70 (housing) about the center axis of the coil bobbin 51 (bobbin). Thus, the air remaining between the housing 70 and the coil 50 can be easily entrapped in the first space S1 or the second space S2 at a location where the connecting portion 80 is filled last. As a result, it is possible to prevent air from remaining between the housing 70 and the coil 50, and the coil 50 can be stably coated by the connecting portion 80.

The embodiment of the fuel injection device of the present invention has been described above including the operational effects thereof. However, the fuel injection device of the present invention is not limited to the embodiment described above, and various modified embodiments can be made without departing from the gist of the invention described in the claims. Furthermore, the embodiment described above has been described in detail for the sake of easy understanding of the present invention, and are not necessarily limited to those having all the described configurations.

For example, in the fuel injection device 1 according to the embodiment described above, the recess is formed between the first outer peripheral surface 46a (first guide portion) and the first outer peripheral surface 10b (second guide portion) by providing the third outer peripheral surface 46d and the third outer peripheral surface 10d. However, in the fuel injection device according to the present invention, one guide portion in which the first guide portion and the second guide portion are continuous may be formed. In the fuel injection device 1 according to the embodiment described above, the first space S1 and the second space S2 are provided. However, the fuel injection device according to the present invention may have a structure in which one of the first space S1 and the second space S2 is provided.

In the present specification, words such as "parallel" and "orthogonal" are used, but these do not strictly mean only "parallel" and "orthogonal", and may be in a state of "substantially parallel" or "substantially orthogonal" including "parallel" and "orthogonal" and in a range in which the function can be exhibited.

REFERENCE SIGNS LIST 1 fuel injection device
10 nozzle main body
10a inner peripheral surface
10b first outer peripheral surface (second guide portion)
10c second outer peripheral surface
10d third outer peripheral surface
10e upper end face
11 injection hole
12 injection hole forming member
14 large-diameter portion
16 cylindrical hole
20 valve body
21 rear end portion
22 intermediate portion
23 distal end portion
30 movable core
40 fixed core
42 through-hole
43 opening
45 large-diameter portion
45a outer peripheral surface
45b upper end face
45c lower end face
45d notch outer peripheral surface
46 small-diameter portion
46a first outer peripheral surface (first guide portion)
46b second outer peripheral surface
46c recessed portion
46d third outer peripheral surface
46e step surface
50 coil
51 coil bobbin
51a bobbin outer peripheral surface
51b bobbin inner peripheral surface
51c bobbin upper end face
51d bobbin lower end face
51e first space communication groove
51f second space communication groove
62 adjustment member
70 housing
70a first inner peripheral surface
70b second inner peripheral surface
70c step surface
70d inner bottom surface
71 through-hole
80 connecting portion
81 connector
90 filter
124 seat portion
124a seat surface
230 spherical surface portion
811 terminal
AX1 center axis line
S1 first space
S2 second space

The invention claimed is:

1. A fuel injection device comprising: a movable core; a fixed core facing the movable core; a coil that generates a magnetic attraction force between the fixed core and the movable core by being energized; a housing that covers a radially outer side of the coil;
and a resin member that is filled in the housing and coats the coil, the fuel injection device further comprising:
a bobbin arranged in the housing and having an outer peripheral surface that holds the coil and an inner peripheral surface that is a surface on a side opposite to the outer peripheral surface; and
a guide portion that comes into contact with an inner peripheral surface of the bobbin are provided,
wherein
an internal space is formed by the guide portion and an inner peripheral surface of the bobbin, and
the internal space communicates with a space filled with the resin member.

2. The fuel injection device according to claim 1, wherein when a direction in which the movable core and the fixed core face each other is defined as a vertical direction, a side on which the fixed core is disposed is defined as an upper side, and a side on which the movable core is disposed is defined as a lower side,
the internal space includes
a first space formed on the upper side in the vertical direction than the guide portion by the guide portion and an inner peripheral surface of the bobbin,
a second space formed on a lower side in the vertical direction than the guide portion by the guide portion and an inner peripheral surface of the bobbin, and
at least one of the first space and the second space communicates with a space filled with the resin member.

3. The fuel injection device according to claim 2, wherein an axial direction of the coil is parallel to the vertical direction; and
the guide portion includes a first guide portion that faces an upper side of a center position in the vertical direction of the coil and is in contact with an inner peripheral surface of the bobbin, and a second guide portion that faces a lower side of the center position in the vertical direction of the coil and is in contact with the inner peripheral surface of the bobbin.

4. The fuel injection device according to claim 3, further comprising:
a valve body that moves in the vertical direction by the movable core; and
a nozzle that movably accommodates the valve body, wherein
the first guide portion is provided in the fixed core arranged on an inner side of the bobbin, and
the second guide portion is provided in the nozzle arranged on an inner side of the bobbin.

5. The fuel injection device according to claim 3, further comprising:
a valve body that moves in the vertical direction by the movable core; and
a nozzle that includes a through-hole through which the valve body passes,
wherein the first guide portion and the second guide portion are provided in the nozzle arranged on an inner side of the bobbin.

6. The fuel injection device according to claim 3, wherein the first guide portion and the second guide portion are provided in the fixed core arranged on an inner side of the bobbin.

7. The fuel injection device according to claim 2, wherein the first space communicates with a space filled with the resin member, and
the bobbin includes a first space communication groove that communicates the space filled with the resin member and the first space.

8. The fuel injection device according to claim 2, wherein the second space communicates with a space filled with the resin member, and
the bobbin includes a second space communication groove that communicates the space filled with the resin member and the second space.

9. The fuel injection device according to claim 7, wherein the first space communication groove and a second space communication groove are provided at positions symmetrical to a filling port through which the housing is filled with the resin member about a center axis of the coil.

* * * * *